T. L. CARBONE.
RESILIENT TIRE.
APPLICATION FILED OCT. 4, 1913.
1,192,036.
Patented July 25, 1916.
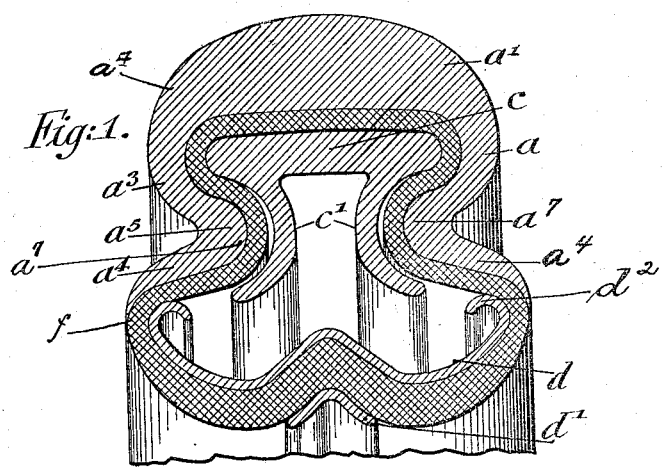
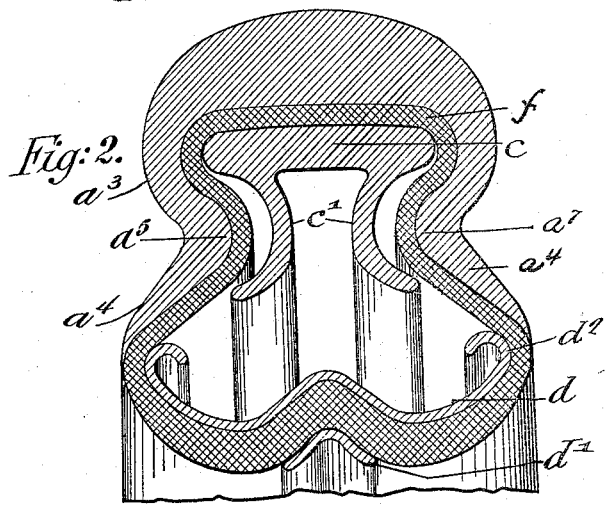
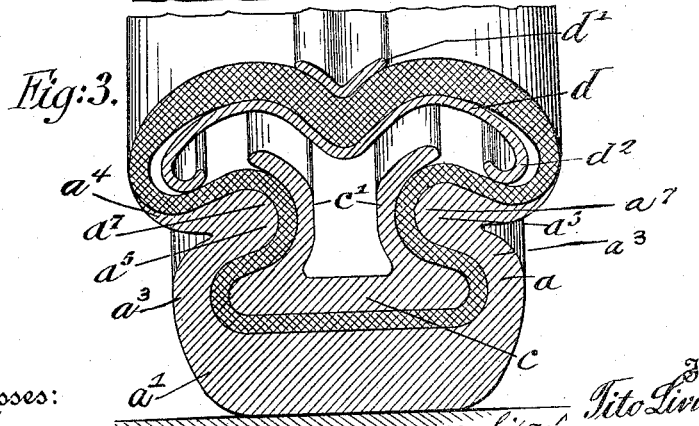
Witnesses:
F. Hogg.
G. Lowe.
Inventor
Tito Livio Carbone
By his Attorney
C. P. Jochel

UNITED STATES PATENT OFFICE.

TITO LIVIO CARBONE, OF CHARLOTTENBURG, GERMANY.

RESILIENT TIRE.

1,192,036.  Specification of Letters Patent.  Patented July 25, 1916.

Original application filed February 12, 1910, Serial No. 543,525. Divided and this application filed October 4, 1913. Serial No. 793,312.

*To all whom it may concern:*

Be it known that I, TITO LIVIO CARBONE, a citizen of the Swiss Republic, and a resident of Charlottenburg, near Berlin, Germany, have invented certain new and useful Improvements in Resilient Tires, of which the following is a specification.

This is a divisional application of my co-pending application filed by me on February 12th, 1910, under Serial No. 543,525.

This invention, as also the invention just referred to, relates to resilient tires of the kind wherein rigid rings are connected with each other.

The object of the invention is to provide a tire which does not have the objectionable features of tires hitherto in use, and in consequence has long life and resiliency.

The invention consists in providing an elastic connection intermediate the rigid rings so arranged that it readily permits a certain movement of the rings toward and from each other, but which is sufficiently resistant to offer an elastic resistance to a further movement of the rings in the same direction, at the same time tending to maintain the rings normally spaced apart.

More particularly the invention consists of a connection for resilient tires connecting normally spaced rigid rings and having inwardly bent folds around the circumference at both sides of the rigid rings, vulcanized to permanent mean normal shape laterally bent inwardly with respect to the central plane of the rings, which inner folds when distorted in any direction, react simultaneously throughout the circumference of the rings to return to initial position.

The invention consists of other novel features and combinations of parts hereinafter set out and claimed.

In the accompanying drawings, Figure 1 represents a vertical transverse section through a tire embodying the invention, showing the tire in its normal unloaded condition, the said figure showing only a fragmentary section. Fig. 2 is a similar view in extended position, corresponding to the upper part of the tire when load is applied, and Fig. 3 is also a similar view, showing a collapsed position, corresponding to the lower part of the tire when load is applied.

Similar letters of reference indicate corresponding parts throughout the various figures.

Referring to the drawings, and more particularly to Fig. 1, the tire casing $a$ is provided integrally with a tread $a^1$, and with an inner ring $d$, rigid and pressed out of sheet steel or the like. The inner ring $d$ has a curved side part $d^2$, and it acts to stretch the tire casing and hold it in position, and this rigid ring is known as a stretching-ring. An outer ring $c$ is arranged within the tire casing and has a strengthening rib $c^1$, this outer ring acting as a floating ring. The tire casing is made of a rubber layer and a fabric layer or layers $f$, forming a connection between the rigid rings $c$ and $d$. The tire casing consists of lateral members $a^3$ and $a^4$, joined integrally at $a^5$. The fabric layer or layers follow the shaping of the rubber layer. The members $a^3$ and $a^4$ are provided with an enlargement $a^7$ which acts as a cushion when that portion of the cover is pressed against the strengthening rib $c^1$. In the embodiment shown in Fig. 1, in which the fabric layer $f$ is within the outer rubber layer, the lateral sides of the tire casing are formed into an inwardly extending fold with the bend directed inwardly of the outer part of the rings, and with the open part facing the exterior of the tire. Such folds are provided at both sides of the rings and extend unbrokenly circumferentially around the same, being bent laterally inwardly with respect to the central plane of the rigid rings. The folds are vulcanized to a permanent mean normal shape and when distorted in any direction from this shape by the relative movement of the outer ring with respect to the inner ring, always react to return to initial position. The lateral walls of the tire casing which form the improved connection in the form of an inward fold in this embodiment are normally curved inward as shown in Fig. 1.

The operation of the tire shown is substantially like that described in my co-pending application, and is as follows: The embodiment shown in the drawing is made of suitable rubber or other elastic material, suitable fabric, etc., and vulcanized into shape to conform to an initial natural position sufficiently resistant in proportion to the weight and driving torque to be distorted only within the elastic limit in any direction by the operative movement of the rings relative to each other and sufficiently strong to return to substantially initial or unstrained state. As, in the embodiment, the connection is arranged along the circumference of the rings, it reacts simultaneously at portions thereof to return the displaced parts to initial position and thereby returns the rings to a position substantially concentric with each other. An elastic resistance of tension and twisting to the flattening of the fold is created and a displacement of the extremities of the fold does not produce a permanent yield.

The weight, being a vertical force, may be divided at every radius of the wheel, into two components, one parallel and one perpendicular to the radius. At the top and bottom of the tire, this stress is entirely in the direction of the vertical diameter, and at the portions of the tire on the horizontal diameter, this stress is entirely perpendicular to said horizontal diameter. The component in the direction of the radius thus varies from zero to a maximum in every quadrant of the tire, and the same is correspondingly true of the component perpendicular to the radius.

The strain, similarly, has two components, one in the direction of the radius, that elongates or compresses the connection between the rings, thereby changing the interradial dimensions and a component perpendicular to the radius, of a bending or twisting nature. These component strains vary from zero to a maximum, like the stresses producing them. The driving torque of the vehicle produces a uniform peripheral strain, perpendicular to the radii, which strain may be very great in a high powered vehicle.

The fold is an advantageous form for affording a maximum of vertical elastic play, with a minimum of strain, because the elongation or compression of its members is less than the corresponding displacement of the rings, since the stresses produce a bend or twist instead of only tension and compression. By giving portions of the fold, preferably those adjacent the ring, a relative vertical rigidity, the bend of these rigid members is limited, and the fold is prevented from collapsing into a plane surface. The center of the fold is made preferably weaker than the upper and lower members thereof, so that this center undergoes the initial and the greatest distortion, affords a limited elastic play for small shocks, while the relative rigidity of the other members of the fold restrains the free elastic play within certain limits. It is sometimes desirable to make a part of the fold adjacent a ring absolutely rigid, and rigidly connected thereto, so as to prevent a collapse of the fold, and confine the play to the parts laterally situated with respect to the central plane.

The fold is an advantageous form for giving an elastic play to the stresses that are peripheral, or tangential to the tire because the reaction, being of a twisting or bending nature, has the upper lower members of the fold as lever arms, and hence only a small strain is necessary to produce a large reacting moment. If parts of the fold are made of great transverse rigidity, so that they are not distorted by the tangential stresses, the yield of the fold can be limited and confined to certain portions. The preferable form is where the upper and lower members are of great transverse rigidity with an elastic center. Then, since the elastic portion between the rigid twisting members is small, the strain caused by the said twisting members, moved by the rings, is correspondingly small. The twisting reaction being at the extremity of the fold farthest away from the central plane of the rings, has the entire length of the upper and lower rigid members as lever arms.

It is not necessary that the tread be integral with the rest of the tire casing; but this is a convenient way of holding the floating ring within the tire casing. This is accomplished by making the floating ring of larger external dimensions than the corresponding interior portion of the tire casing. This ring, when forced into the tire casing, separates the elastic walls, whose reaction produces a frictional grip upon the said ring. Again, when the elastic material of the tread meets a sudden resistance, it spreads out laterally, away from the central plane of the rings, producing a distortion of the folds that precedes or accompanies the displacement of the floating ring, thus making the shock and strain less violent.

The fold, therefore, is preferably vulcanized to a mean curvature and to a certain rigidity, so that it will not be permanently deformed, or be strained beyond the limits of elasticity, by the applied stresses. This rigidity is proportional to the weight and driving torque of the vehicle.

The connection may be made of any suitable material, and an embodiment of my invention has been shown, but I do not wish to be limited to the details thereof, since changes may be made therein within the scope of the appended claims.

I claim:

1. In resilient tires having normally spaced rigid rings, connections connecting the rings arranged around the circumference of both sides of the rings, vulcanized to permanent mean normal shape, laterally bent inwardly with respect to the central plane of the rings, which inwardly bent connections, when distorted in any direction, react simultaneously throughout the circumference to return to initial position, said connections remaining inwardly bent when the load is applied and at all times, and always tending to return to their original shape, whereby all the strains undergone by said connections are transverse bending strains.

2. In resilient tires having normally spaced rigid rings, a cover connecting the rings, having folds around the circumference of both sides of the rings, vulcanized to permanent mean normal shape, sharply and laterally bent inwardly with respect to the central plane of the rings, which inwardly bent folds, when distorted in any direction, react simultaneously throughout the circumference to return to initial position, said connections remaining inwardly bent when the load is applied and at all times, and always tending to return to their original shape, whereby all the strains undergone by said connections are transverse bending strains.

3. In resilient tires having normally spaced rigid rings, a cover connecting the rings, having continuous folds around the circumference of both sides of the rings and at the sides of the same, inclined to permanent mean normal shape, bent sharply inwardly from the sides of the rings laterally with respect to the central plane of the rings in opposite directions to each other and having lateral fabric reinforcement, which folds, when distorted in any direction, react simultaneously throughout the circumference, to return to initial position, said connections remaining inwardly bent when the load is applied and at all times, and always tending to return to their original shape, whereby all the strains undergone by said connections are transverse bending strains.

4. In resilient tires having normally spaced rigid rings, one of said rings having strengthening ribs, connections connecting the rings arranged around the circumference of both sides of the rings, vulcanized to permanent mean normal shape, sharply and laterally bent inwardly with respect to the central plane of the rings, said connections remaining inwardly bent when the load is applied and at all times, and always tending to return to their original shape, whereby all the strains undergone by said connections are bending strains, said connections being provided with cushioning fabric at the interior thereof at those portions of said connections adjacent the sides of the rings and adjacent said strengthening ribs, the portions of said connections adjacent said strengthening ribs being freely movable with respect thereto.

5. In resilient tires having normally spaced rigid rings, one of the rings acting as a stretching ring, and the other acting as a floating ring, the stretching ring extending laterally outwardly, and provided with curved edge portions, and the floating ring being provided with curved strengthening ribs, a cover connecting the rings and having a tread, said cover having folds around the circumference of both sides of the rings vulcanized to permanent mean normal shape, and laterally bent inwardly with respect to the central plane of the rings, which inwardly bent folds, when distorted in any direction, react simultaneously throughout the circumference to return to initial position, the peak of the folds coöperating with the strengthening ribs.

6. In resilient tires having normally spaced rigid rings, a cover consisting of a single envelop of suitable fabric extending around the two spaced rings, said cover having a rubber tread portion at the outside of the outer ring, and rubber parts joined thereto at the side parts thereof intermediate said spaced rings, said side parts intermediate said spaced rings extending completely around the sides of said rings, and being vulcanized to permanent mean normal shape, laterally bent inwardly with respect to the central plane of the ring in a substantially horizontal direction, so that said inward fold is maintained when the load is applied and at all times and in all parts of said cover, whereby all the strains undergone by said cover are transverse bending strains.

In testimony, that I claim the foregoing as my invention, I have signed my name in presence of two subscribing witnesses.

TITO LIVIO CARBONE.

Witnesses:
C. P. GOEPEL,
F. HOGG.